(12) United States Patent
Tavassoli Hozouri

(10) Patent No.: US 7,714,794 B2
(45) Date of Patent: May 11, 2010

(54) RFID ANTENNA

(76) Inventor: Behzad Tavassoli Hozouri, 3707 Poinciana Dr., #91, Santa Clara, CA (US) 95051

( * ) Notice: Subject to any disclaimer, the term of this patent is extended or adjusted under 35 U.S.C. 154(b) by 262 days.

(21) Appl. No.: 11/307,016

(22) Filed: Jan. 19, 2006

(65) Prior Publication Data
US 2006/0208900 A1    Sep. 21, 2006

Related U.S. Application Data

(60) Provisional application No. 60/593,492, filed on Jan. 19, 2005.

(51) Int. Cl.
*H01Q 9/26* (2006.01)
*G08B 13/14* (2006.01)

(52) U.S. Cl. ............... 343/795; 343/803; 343/895; 340/572.7

(58) Field of Classification Search ............ 343/895, 343/702, 742, 867, 806, 700 MS, 802, 803, 343/804, 807, 767, 770, 795; 340/572.7
See application file for complete search history.

(56) References Cited

U.S. PATENT DOCUMENTS

| | | | |
|---|---|---|---|
| 3,757,344 A * | 9/1973 | Pereda | 343/770 |
| 6,346,922 B1 * | 2/2002 | Proctor et al. | 343/795 |
| 6,717,551 B1 * | 4/2004 | Desclos et al. | 343/700 MS |
| 6,809,699 B2 * | 10/2004 | Chen et al. | 343/795 |
| 6,999,028 B2 * | 2/2006 | Egbert | 343/700 MS |
| 7,075,493 B2 * | 7/2006 | Azadegan et al. | 343/767 |
| 7,262,740 B2 * | 8/2007 | Tikhov et al. | 343/770 |

* cited by examiner

*Primary Examiner*—Michael C Wimer
(74) *Attorney, Agent, or Firm*—Workman Nydegger

(57) ABSTRACT

An antenna particularly suitable for use in radio frequency identification (RFID) transponders. First and second half portions each include nominally straight conductive sections primarily defining a radiating characteristic and nominally spiral conductive sections creating a positive reactive characteristic of the antenna. The straight conductive sections have feed points for connecting the antenna into the RFID transponder, and further connect with the respective spiral conductive sections. The first and said second half portions characterize the antenna as being a dipole type, and adding an optional loop section connecting the straight conductive sections can further characterize it as being of a folded dipole type.

14 Claims, 2 Drawing Sheets

RFID ANTENNA

CROSS-REFERENCE TO RELATED APPLICATIONS

This application claims the benefit of U.S. Provisional Application No. 60/593,492, filed 19 Jan. 2005.

TECHNICAL FIELD

The present invention relates generally to electrical communications, more particularly to condition-responsive indicating systems, yet more particularly to detectable devices or tags, and still more particularly to where a detectable device or tag has a particular aerial wave collector structure for sending or receiving signals.

BACKGROUND ART

Radio Frequency Identification (RFID) systems are in wide and growing use today. FIG. 1 (prior art) is a schematic diagram depicting an example RFID system including an interrogator and a transponder. In some RFID systems the "identifying" information is written into the transponder during manufacture and never changed, making the interrogator merely a reader. In other systems, however, the identifying information in the transponder can be changed and the interrogator used can then be both a reader and a writer. In view of this, the term "interrogator" is used herein to generically mean a reader, a writer, or both. The terms "transponder" and "tag" have become almost synonymous and are used herein as such.

RFID tags are generally classified by whether they are active or passive. A passive-type RFID tag includes transponder circuitry and an antenna, while an active-type RFID tag additionally includes a power source, such as a battery, fuel-cell, or some equivalent. The circuitry in transponders today is usually embodied in a single integrated circuit, hence the term "transponder chip" is often used.

FIG. 1 depicts a passive-type RFID tag. Such tags are used primarily as the examples in this discussion because they are the most commonly used type today and because they will usually benefit more noticeably by use with the present invention. Nonetheless, it should be appreciated that many active-type RFID designs will also benefit by use of the invention.

A passive-type RFID tag extracts energy from an externally provided radio frequency (RF) wave. Typically this RF wave is an interrogation signal being used to excite the antenna to read or write information in the tag. The lack of a built-in energy source tends to make passive RFID tags cheaper to manufacture, longer lasting, and more reliable. This also tends to make them environmentally friendly, because they do not include the environmentally unfriendly substances typically used in power sources. The lack of a built-in energy source, however, also limits the effective operating range of a passive RFID tag with respect to the given energy in an interrogation signal. For example, to increase operating range or if signal propagation between an interrogator and a tag is somehow limited, it follows that the interrogator being used with a passive RFID tag will have to radiate the interrogation signal at a higher power level to accomplish the task at hand.

Unfortunately, simply increasing the power level of an interrogation signal to insure successful interrogator-tag communications is not always possible. For instance, simple inefficiency can exacerbate problems such as battery life and heat dissipation in the interrogator. Of more serious concern, RF energy radiation intended for one system can interfere with other electronic systems and, in extreme cases, can be unsafe for biological systems, e.g., humans, animals, plants, etc. For this reason, most governments limit RF energy radiation levels, and the United States and both Europe are notable in this respect.

With reference again to FIG. 1, the exemplary passive-type RFID tag depicted there includes an antenna, a matching network, a modulator, a rectifier, and a logic sub-circuit. The antenna is a dipole-type, as is frequently used in RFID systems today. The matching network is shown in a dashed outline because it is optional, as discussed below. The circuitry depicted in the matching network, modulator, and rectifier in FIG. 1 is merely representative, and no circuitry is depicted in the logic sub-circuit because such can vary considerably and is not particularly germane to this discussion. The antenna and the matching network usually must be implemented in discrete components, but the modulator, rectifier, and logic sub-circuit are usually implemented today as a single integrated circuit "transponder chip."

Temporarily ignoring the matching network, the antenna is connected to the "front end" of the transponder chip and the electromagnetic field of an interrogation signal that impinges on the antenna must produce an output signal having a voltage above a given threshold before the transponder chip can rectify it.

Rectifying the received interrogation signal can serve multiple purposes. In a passive RFID tag it provides the power needed to operate the logic sub-circuit, and ultimately also the modulator that permits the transponder to "send" its identifying information back to an interrogator as backscatter radiation. Additionally, rectification demodulates the interrogation signal if it is providing information to the transponder. This is so if the logic sub-circuit is being programmed, either with the identifying information that the transponder will "reply" with when later read, or with any other programming that the logic sub-circuit can accept. Additionally, the RF carrier of an interrogation signal may include some indication to transponders that it works with that it is a valid interrogation signal, e.g., a particular sub-carrier frequency. This permits the transponder to remain silent when energized by other, invalid RF signals.

To maximize the voltage produced by the antenna, and to thus increase the energy provided to the transponder, the impedance between the antenna and the transponder should match at the operating frequency of the particular interrogation signal being used. One known approach to improving this impedance matching is to utilize circuits of either discrete components, e.g., inductor and capacitor networks or distributed elements such as microstrip structures. The inductor and capacitor matching network shown in FIG. 1 is an example. Unfortunately, these approaches are often undesirable because they increase the cost, complexity, and size of the RFID tag and decrease its efficiency.

It would clearly be very desirable be able to produce an RFID tag with an antenna that is directly matched to the RF circuitry of the transponder chip, to make the most of interrogation signals that are received and to increase the possible operating range between the RFID tag and the interrogator it is used with. Unfortunately, this has until now not been possible without accepting other undesirable consequences.

To achieve optimal impedance matching the transponder antenna should be the conjugate of the impedance of the transponder chip. However, due to its use of diodes and capacitors, the rectifier at the front end of the transponder chip has an input impedance that is a complex value in nearly all cases, comprising both a positive real component and a negative imaginary component. The impedance of the antenna therefore should have the same real component and a positive imaginary component. This normally requires an increase in antenna size, in comparison with a resonant dipole, and that especially conflicts with the usual design goals of reducing overall transponder size and cost.

DISCLOSURE OF INVENTION

Accordingly, it is an object of the present invention to provide an improved antenna structure and methods for using such in radio frequency identification (RFID) transponders (or "tags").

Briefly, one preferred embodiment of the present invention is an antenna for use in a radio frequency identification (RFID) transponder. A first and a second half portions are provided that each include a straight conductive section and a spiral conductive section.

The straight conductive sections primarily define a radiating characteristic of the antenna and the spiral conductive sections create a positive reactive characteristic of the antenna. The straight conductive sections each have a feed point where the antenna can be connected into the RFID transponder. The straight conductive sections effectively connect with their respective spiral conductive section, thereby having the first and second half portions characterize the antenna as being of a dipole type.

Briefly, another preferred embodiment of the present invention is also an antenna for use in a radio frequency identification (RFID) transponder, having all of the elements of the just recited embodiment and additionally having a loop section connecting the straight conductive sections of the first and second half portions and thus further characterizing the antenna as being of a folded dipole type.

An advantage of the present invention is that it is particularly suitable for use in passive-type RFID tags by virtue of its high efficiency. Although, the present invention is also quite suitable and beneficial for use in many active-type RFID tag designs.

Another advantage of the invention is that it can be implemented as a simple structure having a small size, thus making it suitable to serve in applications where a size is a limitation and making its manufacture and materials requirements quite economical.

Another advantage of the invention is that it permits a more omni directional antenna pattern than many existing designs, facilitating consistent and reliable transponder detection.

And another advantage of the invention is that it matches well with the rectifier of the RFID device it is used in without employing additional, discrete circuit elements.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
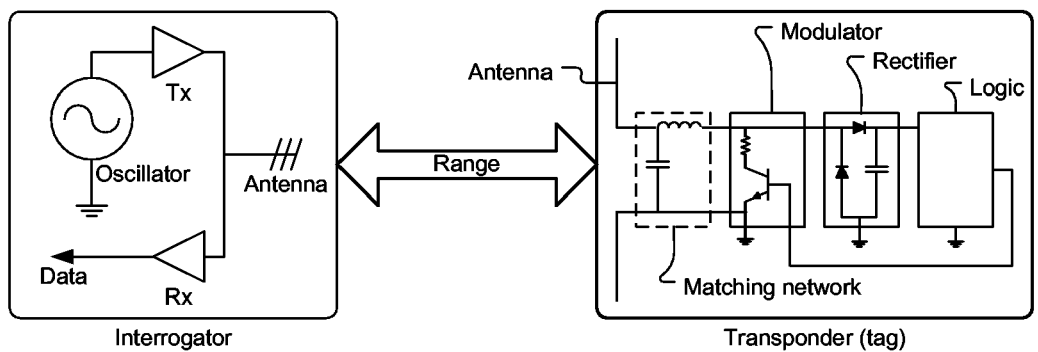
FIG. 1 (prior art) is a schematic diagram depicting an example RFID system including an interrogator, transponder, and representative circuitry therein.

A preferred embodiment of the present invention is an antenna for use in Radio Frequency Identification (RFID) transponders. As illustrated in the various drawings herein, and particularly in the views of FIG. 2-5, preferred embodiments of the invention are depicted by the general reference characters 10, 30, 50, and 70.

Figure 2:
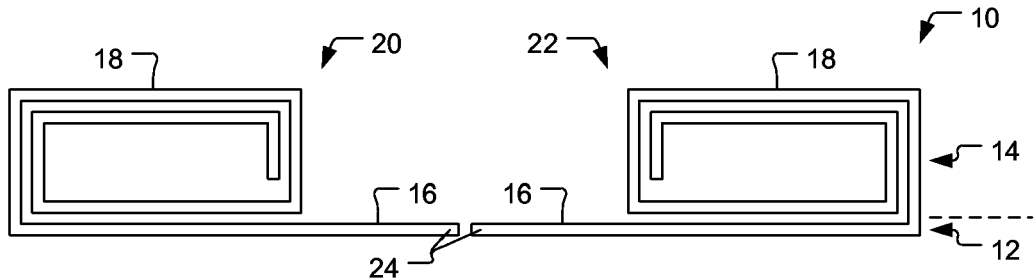
FIG. 2 depicts a dipole type antenna in accord with the present invention.

FIG. 2 depicts an antenna 10 in accord with the present invention that consists of two sections 12, 14. The first section 12 consists of the mainly radiating components, here straight conductive traces 16, while the second section 14 consists of substantially reactive components, here spiral conductive traces 18. The spirals shown in the figures herein are typical, and might have an arbitrary number of turns, lengths, widths, etc.

In the characteristic manner of dipole-type antennas, the antenna 10 here has a left dipole half 20 mirrored by a right dipole half 22. These half's of the antenna 10 do not correspond with and should not be confused with the sections 12, 14. The left dipole half 20 of the antenna 10 includes both a first section 12 and a second section 14, as does the right dipole half 22. Each first section 12 includes a feed point 24, for connecting the antenna 10 to a transponder chip (not shown). As shown, each first section 12 also, directly or indirectly, connects to its respective second section 14.

In use, the spiral structures of the second sections 14 (the spiral conductive traces 18 in FIG. 2) substantially increase the imaginary part of the impedance of the antenna 10. The use of such a spiral structure has the particular advantage over traditional meander-line structures as it creates the positive reactive component of the impedance in a more compact size.

Figure 3:
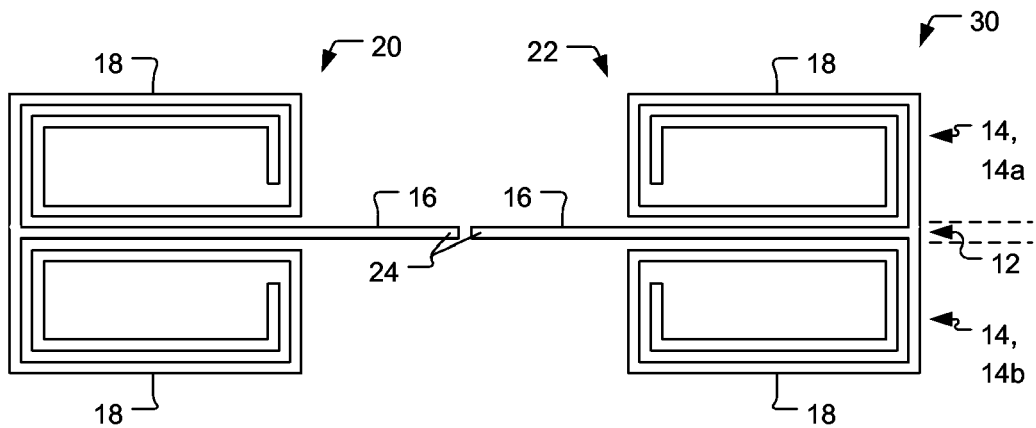
FIG. 3 depicts another dipole type antenna in accord with the present invention.

FIG. 3 depicts another antenna 30, extending the dipole type principles of the antenna 10 in FIG. 2. The antenna 30 also consists of two sections 12, 14, but the second section 14 here has two parts, a sub-section 14a and a sub-section 14b, that include four spiral conductive traces 18.

Figure 4:
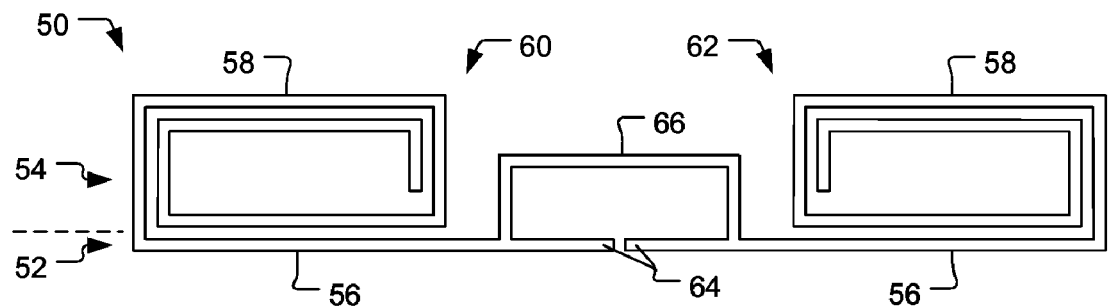
FIG. 4 depicts a folded-dipole type antenna in accord with the present invention.

FIG. 4 depicts an antenna 50 in accord with the present invention that also consists of two sections 52, 54. The first section 52 consists of the mainly radiating components (straight conductive traces 56) and the second section 54 consists of the substantially reactive components (spiral conductive traces 58). The antenna 50 here also has a left folded dipole half 60 and a mirrored right folded dipole half 62, with each first section 52 including a feed point 64 for connection to a transponder chip and with each first section 52 also, directly or indirectly, connecting to its respective second section 54. Unlike the dipole antenna 10 of FIG. 2, however, the antenna 50 of FIG. 3 has a loop section 66 connecting the dipole half's 60, 62 in the manner that conductive loops are traditionally used to create folded dipole-type antennas.

In use, here as well, the spiral structures of the second sections 54 (the spiral conductive traces 58 in FIG. 3) substantially increase the imaginary part of the impedance of the antenna 50 and distinguish it over traditional structures, such as meander-line based designs.

Figure 5:
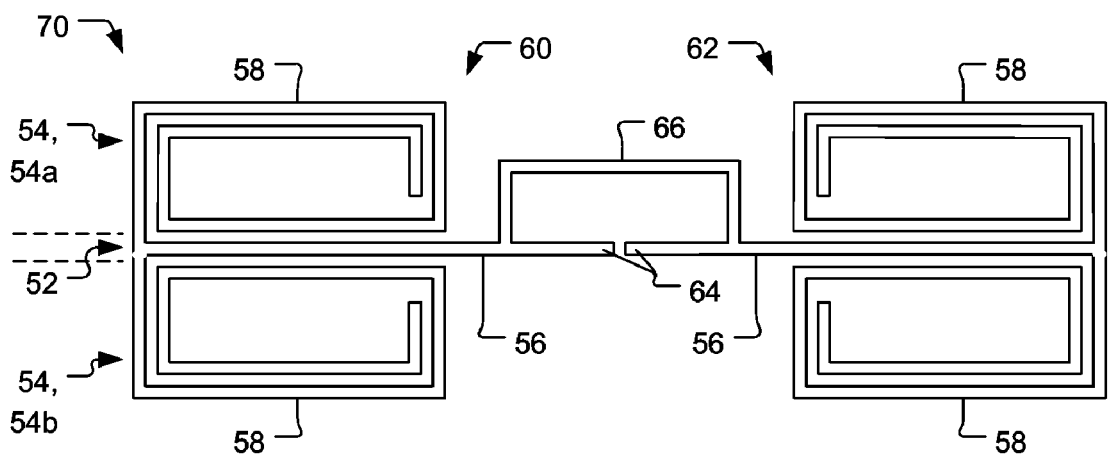
FIG. 5 depicts another folded-dipole type antenna in accord with the present invention.

FIG. 5 depicts another antenna 70, extending the folded-dipole type principles of the antenna 50 in FIG. 4. The antenna 70 also consists of two sections 52, 54, but the second section 54 here has two parts, a sub-section 54*a* and a sub-section 54*b*, that include four spiral conductive traces 58.

The benefits provided by the present invention are substantial. For example, in a standard (straight) dipole antenna having an imaginary part of 63 Ohms for an input impedance at 915 MHz, the length should be more than 160 mm. However, using the embodiment in FIG. 2 (antenna 10), it is possible to achieve the same value with a length of only 50 mm and a width of only 8 mm, which is a considerable improvement over the standard dipole.

In summary, the present invention relates to radio frequency identification (RFID) systems and more particularly to antennas for use in an RFID devices wherein the impedance more optimally matches with the relevant radio frequency (RF) circuitry in the transponder chip. Two major sections form the antenna, with one of them consisting of the mainly radiating components, e.g. conductive metal traces, and the other being substantially reactive components, e.g. consisting of spiral metal traces. The sections are, directly or indirectly, connected, with the mainly radiating components having suitable feed points for connection to the transponder chip. Optionally, loop antenna characteristics can be added by providing a loop section, in largely conventional manner, to the folded dipole structure of the inventive antenna that has now been described.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. An antenna for use in a radio frequency identification (RFID) transponder, the antenna comprising:
   a first half portion and a second half portion each including:
      a straight conductive section defining a radiating characteristic of the antenna;
      a first spiral conductive section and a second spiral conductive section coupled to the straight conductive section creating a positive reactive characteristic of the antenna, the first spiral conductive section spiraling in an opposite direction than the second spiral conductive section and being positioned on an opposite side of the straight conductive section than the second spiral conductive section, the first spiral conductive section and the second spiral conductive section each coupled to the straight conductive section at the same point on the straight conductive section; and
      said straight conductive section having a feed point where the antenna can be connected into the RFID transponder; and said straight conductive section connecting with its respective spiral conductive sections, thereby having said first half portion and said second half portion characterize the antenna as being of a dipole type; and
   a loop section connecting said straight conductive sections of said first half portion and said second half portion.

2. The antenna of claim 1, wherein said first half portion and said second half portion are mirrored opposites that lie within a plane.

3. The antenna of claim 1, wherein said first half portion and said second half portion are formed of printed circuit board traces.

4. The antenna of claim 1, wherein said first half portion and said second half portion are mirrored opposites and lie within a plane.

5. The antenna of claim 1, wherein said first half portion and said second half portion are formed of printed circuit board traces.

6. An antenna for use in a radio frequency identification (RFID) transponder, the antenna comprising:
   first and second dipole means to radiate or receive radio frequency (RF) energy, said first and second dipole means each including:
      straight conductive means to define a radiating characteristic of the antenna; and
      first and second spiral conductive means to create a positive reactive characteristic of the antenna, the first spiral conductive means spiraling in an opposite direction than the second spiral conductive means and being positioned on an opposite side of the straight conductive means than the second spiral conductive means, the first spiral conductive means and the second spiral conductive means each coupled to the straight conductive means at the same point wherein each said straight conductive means connects with its respective said two spiral conductive means at one end, its other end including a feed point to connect the antenna to the RFID transponder; and
   a loop means connecting said straight conductive means of said first dipole means and said second dipole means.

7. The antenna of claim 6, wherein said first and second dipole means are mirrored opposites that lie within a plane.

8. The antenna of claim 6, wherein said first and second dipole means are formed of printed circuit board traces.

9. The antenna of claim 6, wherein said first and second dipole means are mirrored opposites that lie within a plane.

10. The antenna of claim 6, wherein said first and second dipole means are formed of printed circuit board traces.

11. An antenna for use in a radio frequency identification (RFID) transponder, the antenna comprising:
   a first half portion and a second half portion each including:
      a straight conductive section defining a radiating characteristic of the antenna; and
      a first spiral conductive section and a second spiral conductive section coupled to the straight conductive section in order to create a positive reactive characteristic of the antenna, the first spiral conductive section spiraling in an opposite direction than the second spiral conductive section and being positioned on an opposite side of the straight conductive section than the second spiral conductive section, the straight conductive section connecting with the first and second spiral conductive sections at a first end and having a second end thereof connected to an RFID transponder; and
   a loop section connecting the straight conductive sections of the first half portion and the second half portion;
   wherein the first half portion and second half portion form a dipole antenna; and
   wherein the first spiral conductive section and a second spiral conductive are each coupled to the straight conductive section at the same point.

12. The antenna of claim 11, wherein the first half portion and the second half portion are mirrored opposites that lie within a plane.

13. The antenna of claim 11, wherein the first half portion and the second half portion are formed of printed circuit board traces.

14. An antenna for use in a radio frequency identification (RFID) transponder, the antenna comprising:

a first half portion and a second half portion each including:
   a straight conductive section defining a radiating characteristic of the antenna; and
   a first spiral conductive section and a second spiral conductive section coupled to the straight conductive section in order to create a positive reactive characteristic of the antenna, the first spiral conductive section spiraling in an opposite direction than the second spiral conductive section and being positioned on an opposite side of the straight conductive section than the second spiral conductive section, the straight conductive section connecting with the first and second spiral conductive sections at a first end and having a second end thereof connected to an RFID transponder; and
   a loop section connecting the straight conductive sections of the first half portion and the second half portion, thereby further characterizing the antenna as being of a folded dipole type;
wherein the first half portion and second half portion form a dipole antenna.

* * * * *